United States Patent Office 3,327,386
Patented June 27, 1967

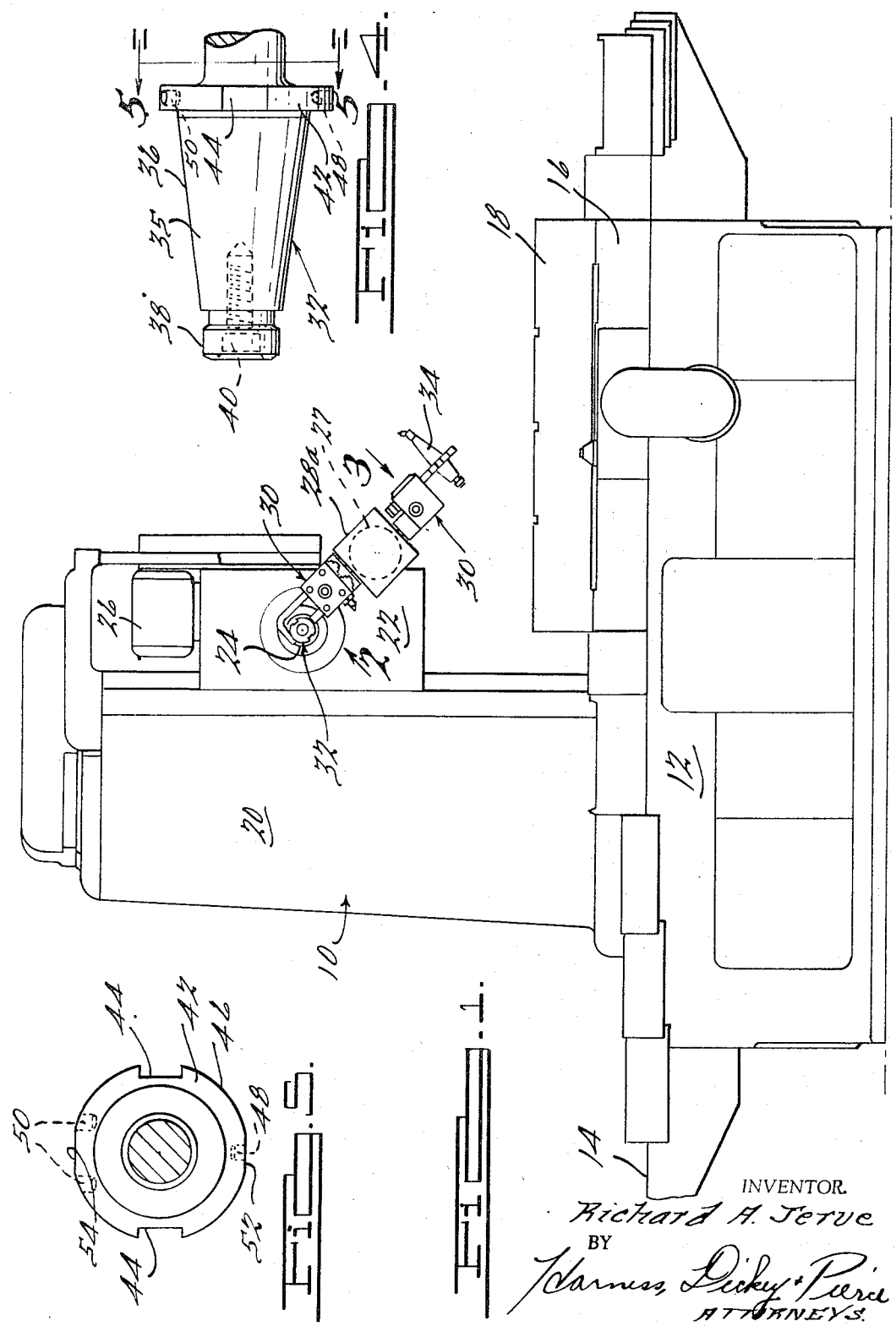

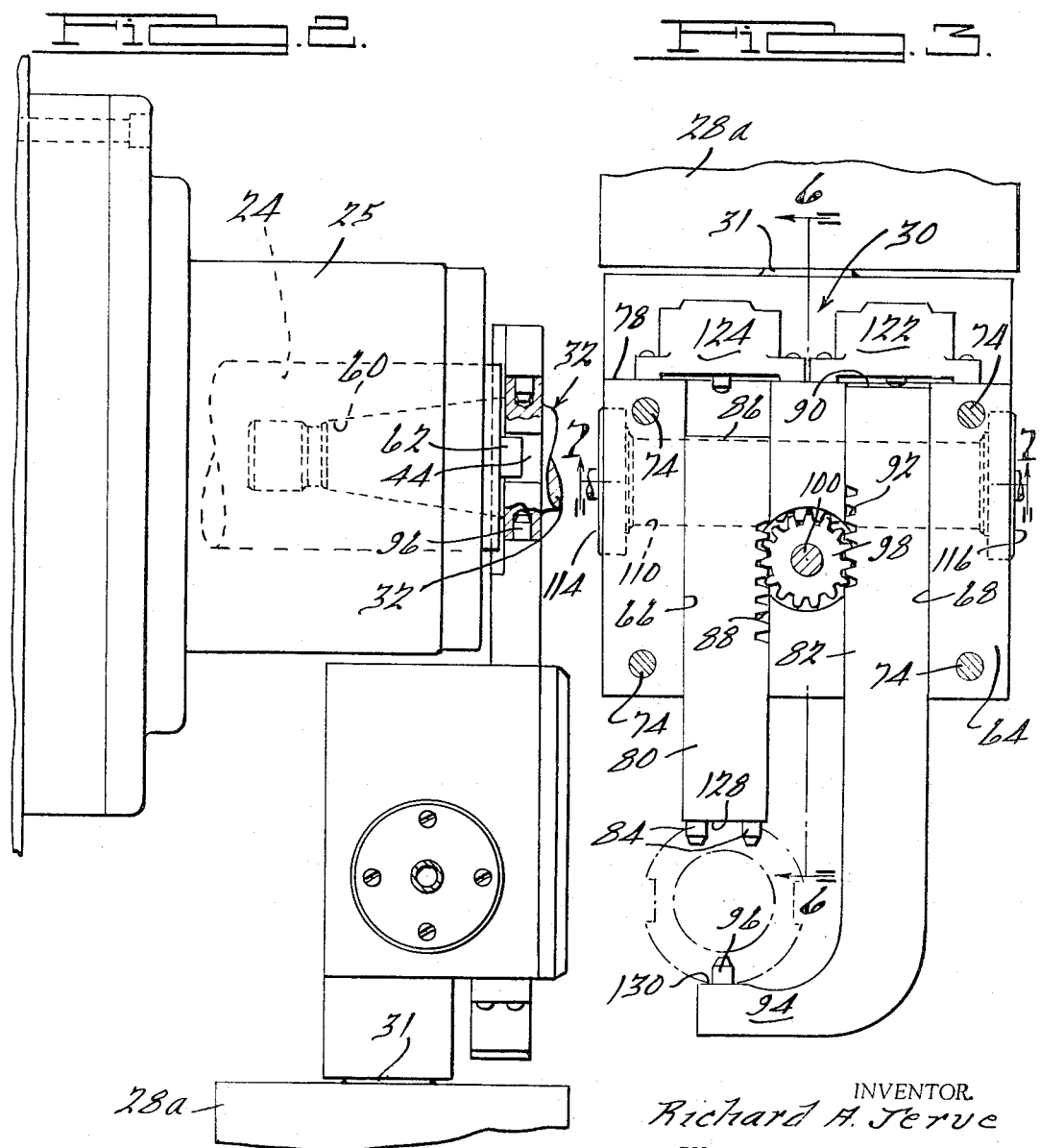

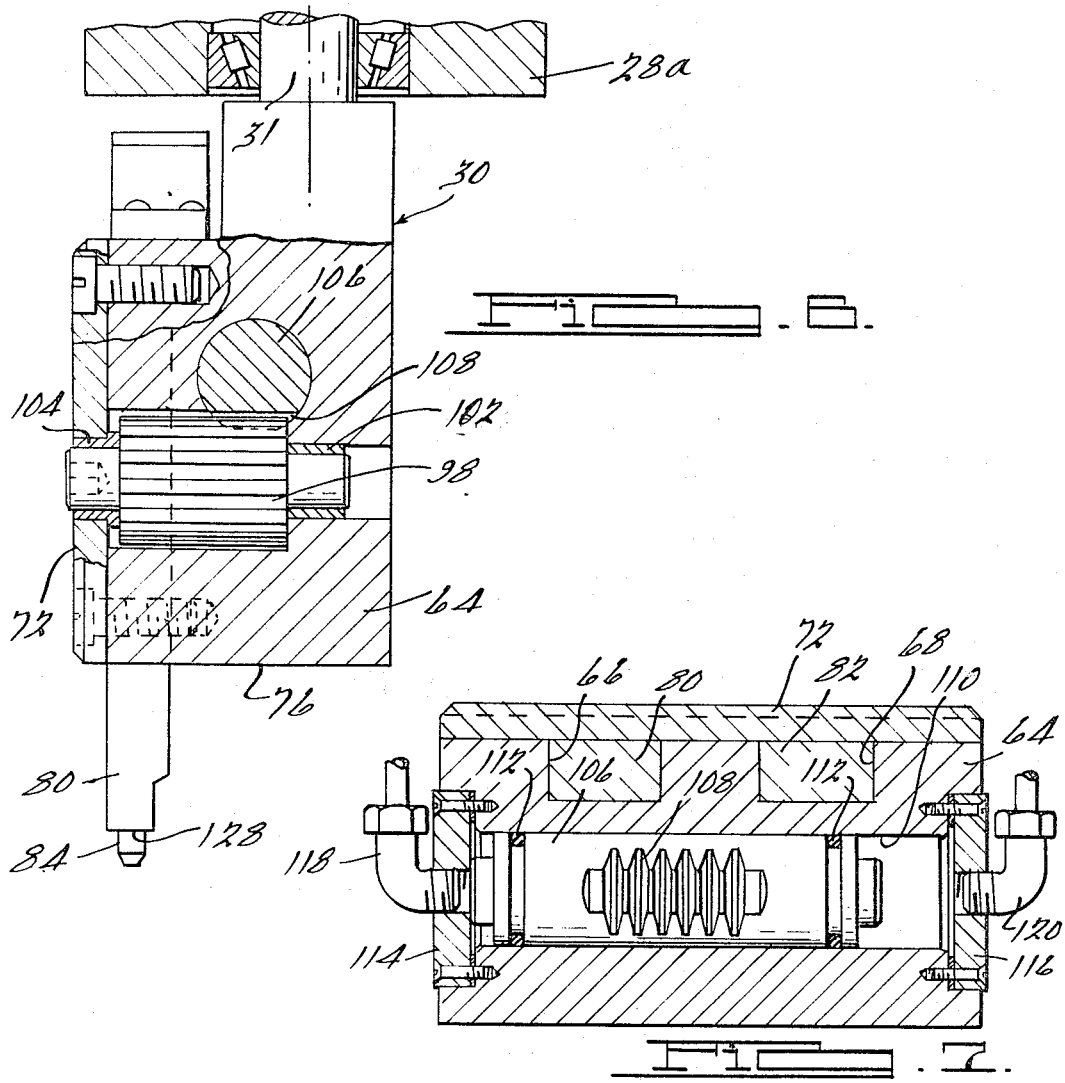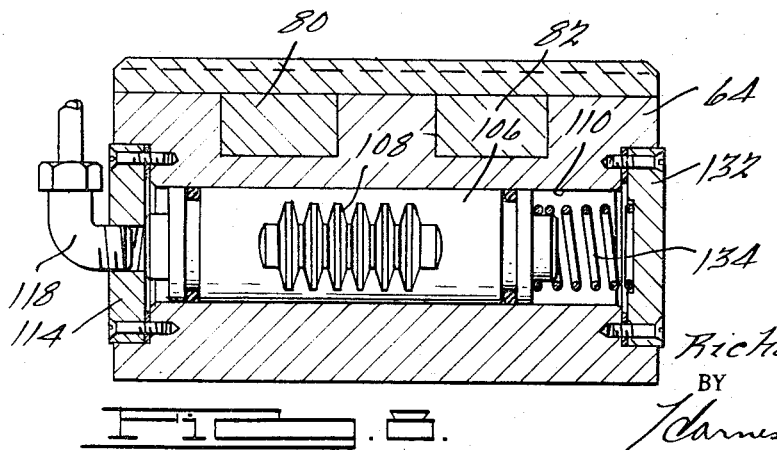

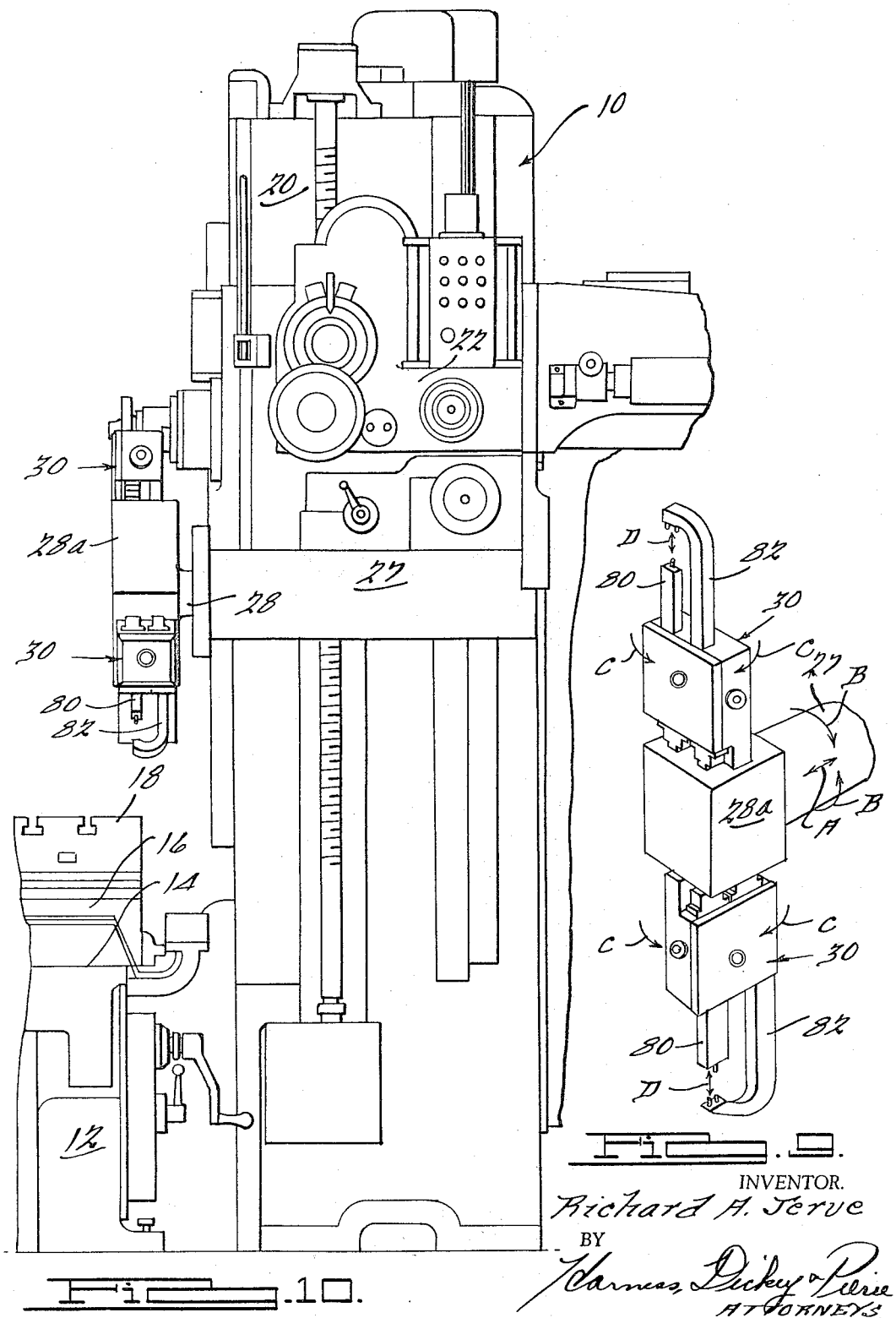

1

3,327,386
TOOL HANDLING MECHANISM AND TOOL
FOR USE THEREWITH
Richard A. Jerue, Birmingham, Mich., assignor to De
Vlieg Machine Company, Royal Oak, Mich., a corporation of Michigan
Filed Dec. 27, 1965, Ser. No. 516,590
15 Claims. (Cl. 29—568)

This invention relates to tools and tool holders of the type adapted to be received in the drive spindle of a machine tool, and to a tool handling or transfer mechanism for gripping a tool or tool holder and transferring it between two locations.

It is an object of the present invention to provide a tool handling mechanism operable to grip a tool or tool holder and lift it into or out of the drive spindle of a machine tool or other supporting structure which encloses the shank of the tool or tool holder.

It is another object of the present invention to provide a tool handling mechanism of the above character which will maintain a positive grip on the tool despite substantial centrifugal and inertial forces tending to separate the tool from the tool holding mechanism and which eliminates any reliance upon friction for retaining a grip on the tool.

It is a further object of the present invention to provide a tool handling mechanism which will maintain a tool in a desired angular orientation as it is being transferred.

It is another object of the present invention to provide a tool handling mechanism of the above character which is rugged in construction, reliable in use, economically manufactured, structurally simple, of precision construction, easily serviced, capable of transporting a tool through several different paths of movement, incorporates fail-safe features, and is able to sense whether a tool has been properly gripped.

It is a still further object of the present invention to provide a tool or tool holder capable of being used with a tool handling mechanism of the above character which occupies no more space than a conventional tool or tool holder, which may be manufactured by machining a conventional tool or tool holder, and which may be used interchangeably with a standard tool or tool holder.

These and other objects of the present invention will become apparent from the following detailed description taken in conjunction with the accompanying drawings, wherein:

FIGURE 1 is a front elevational view of a machine tool having a tool handling mechanism of the present invention mounted thereon, and with a pair of tools of the present invention shown with the tool handling mechanism;

FIG. 2 is an enlarged fragmentary side elevational view of FIG. 1 looking in the direction of the arrow 2 thereof;

FIG. 3 is an enlarged fragmentary side elevational view of the structure of FIG. 1 looking in the direction of the arrow 3 thereof;

FIG. 4 is an enlarged fragmentary view of tool illustrated in FIG. 2;

FIG. 5 is a sectional view of the tool illustrated in FIG. 4 taken along the line 5—5 thereof;

FIG. 6 is a sectional view of the structure illustrated in FIG. 3 taken along the line 6—6 thereof;

2

FIG. 7 is an enlarged sectional view of the structure illustrated in FIG. 3 taken along the line 5—5 thereof;

FIG. 8 is a view of the structure similarly illustrated in FIG. 7 showing a slightly modified form of the invention;

FIG. 9 is a side elevational view with parts removed of the structure illustrated in FIG. 1; and FIG. 10 is an enlarged view of the tool mechanism of FIGS. 1, 2, 3, 6 and 7, removed from the machine and showing the paths of movement of its component parts.

Referring now to the drawings, FIGURES 1 and 8 show a machine tool with which the tool handling mechanism and tool of the present invention may be utilized. This machine tool is representatively illustrated as a horizontal boring and milling machine 10. The machine 10 includes a frame 12 having horizontal ways 14 on which a saddle 16 is reciprocally movable. A table 18 is movable on the saddle 16 in a horizontal direction perpendicular to the axis of movement of the saddle 16. The machine 10 includes a vertical column 20 on which a spindle head 22 is supported for vertical movement. A spindle sleeve 25 is journaled for rotation in the spindle head 22 and carries a spindle 24 in rotation with it. The spindle sleeve 25 is axially stationary, but the spindle 24 can be advanced outwardly along its axis of rotation.

The tool handling mechanism of the present invention includes a tool changer housing 27 mounted on the side of the spindle head 22. The housing 27 supports a tool changer actuating shaft 28 for rectilinear movement along a fixed axis as indicated by the arrows A of FIG. 9. The shaft 28 also oscillates about its axis, as shown by the arrows B of FIG. 9. The shaft 28 has an enlarged head 28a provided with a pair of tool gripper mechanisms 30 on the opposite sides thereof. The gripper mechanisms 30 are supported on the head 28a by shafts 31 for oscillation about axes perpendicular to the axis of the shaft 28, as indicated by the arrows C in FIG. 9. One of the gripping mechanisms 30 is shown adjacent a tool 32 received in the spindle 24 while the other gripper 30 is shown holding a tool 34 in what may be termed a "ready station." This ready station is disposed beneath the level of the spindle and to one side of the spindle head where it is readily accessible to the machine tool operator.

The tool 32 is illustrated in detail in FIGS. 4 and 5 and will be seen to have a shank 35 provided with a conical outer surface 36. The shank 35 additionally has a cylindrical portion 38 provided with a threaded bore 40 for the reception of the customary draw bolt (not shown). Disposed forwardly of the shank 35 is a radially extending annular flange 42 provided with a pair of notches 44 on opposite sides thereof which are open to the circular periphery 46 of the flange 42. The flange 42 has a bore or opening 48 extending radially inwardly from the periphery 46 thereof in a location intermediate the notches 44. A pair of spaced bores or openings 50 are also formed in the flange 12 on the opposite side thereof from the opening 48 and extend inwardly from the periphery 46. The bores 50 are parallel to one another and to the bore 48. Further, they are located on opposite sides of the axis of the bore 48. The bores 48 and 50 are conveniently formed in the flange 42 by drilling. The flange periphery 46 is provided with an annular flat surface 52 which surrounds the opening 48 and is disposed normal to the axis of the bore 48. The flange periphery 46 also has a flat surface 54 which is disposed between the openings 50 and is normal to the axes of the openings 50. The surfaces 52 and 54 are parallel to one another.

The portion of the tool 32 described thus far may be provided irrespective of the particular type of cutting operation to be performed. The configuration of that portion of the tool 32 forward of the flange 42 is entirely optional as far as the present invention is concerned. The tool 32 may carry a cutting edge itself, or it may consist of a tool holder by which other tools are supported and driven in rotation. By way of example, the tools 32 and 34 illlstrated herein are boring bars.

As illustrated in FIGS. 1 and 3, the shank 35 of the tool 32 is received in a socket 60 of the spindle 24 so that a pair of spindle drive keys 62 (FIG. 2) lie within the notches 44. It is to be appreciated that a cutting tool having a tapered shank, such as the shank 35 and a radially extending peripheral flange of generally annular configuration, is commonly used with many machine tools, such as milling machines, horizontal boring machines, vertical turret lathes, vertical jig boring machines, and the like. Such flanged tools conform to the specifications established by the National Machine Tool Builders Association. In order to produce a tool according to the present invention it is only necessary to modify a standard flanged tool by milling the flats 52 and 54 on the flange 42 and then drilling the openings 48 and 50. The tool is thereby adapted for handling by the tool gripper mechanisms 30, as will be susbequently described. It is to be appreciated that such a tool occupies no greater space than the standard tool from which it may be made (in fact, less), and that such a tool may be used either with a machine having a tool handling mechanism of the type illustrated herein or with a machine which is not so equipped. In other words, the special features of the tool 32, which enable it to be used with the tool handling mechanism of the present invention, do not preclude its use in ordinary machine tools.

The structural details of one of the two identical tool gripper mechanisms 30 are best shown in FIGS. 2, 3, 6 and 7, and a description of one will serve to describe both. This structure includes a housing 64 secured to one of the shafts 31. The housing 64 has a pair of spaced parallel ways 66 and 68 defined by slots formed on one surface thereof. The ways 66 and 68 are enclosed by a cover plate 72 secured to the housing 64 by screws 74. The ways 66 and 68 are open to and extend between a pair of opposed end surfaces 76 and 78 of the housing 64. An elongated inner gripper arm 80 is disposed in the way 66 and an elongated outer gripper arm 82 is disposed in the way 68. The arms 80 and 82 are of rectangular cross section. The inner arm 80 is provided with a pair of outwardly projecting spaced parallel locking pins or fingers 84 at one end thereof and with an abutment surface 86 at its opposite end. Rack teeth 88 are formed on the side of the arm 80 adjacent to the arm 82. The arm 82 will be seen to have an abutment surface 90 at its inner end, rack teeth 92 on the side thereof adjacent the arm 80 and a laterally extending tool gripper portion in the form of a flange 94 at its outer end. The flange 94 extends at right angles to the main portion of the arm 82 and its end is in alignment with the arm 80. The flange 94 and arm 80 are disposed on diametrically opposite sides of the tool. The flange 94 has a locking pin or finger 96 projecting therefrom toward the arm 80 and along a line lying midway between the pins 84.

The arms 80 and 82 are arranged for simultaneous parallel movement in opposite directions to advance the pins 84 and 96 toward or away from one another. This movement is produced by rotation of a pinion gear 98 having an integral pin portion 100 journaled for rotation about a fixed axis in plain bearing members 102 and 104 fitted in the housing 64 and cover plate 72, respectively. The pinion 98 is oscillated or angularly moved by means of a piston 106 having rack teeth 108 cut on one side thereof. The rack teeth 108 mesh with the teeth of the pinion 98 at one end thereof while the rack teeth 88 and 92 mesh with the pinion 98 on opposite sides thereof and at its end opposite from the piston 106. The piston 106 is mounted for reciprocation in a cylinder bore 110 formed in the housing 64 and carries O-ring seals 112 at its opposite ends sealingly engageable with the wall of the bore 110. The opposite ends of the bore 110 are closed by closure members 114 and 116 having hydraulic fittings 118 and 120, respectively. Fluid is selectively introduced to the opposite ends of the bore 110 through the fittings 118 and 120 to produce the desired movement of the piston 106. When the piston 106 is moved under fluid pressure to one end of the bore 110, the arms 80 and 82 will be fully opened and when the piston 106 is moved to the other end of the bore 110, the arms 80 and 82 will be fully closed, as illustrated in FIG. 4. In the closed position of the arms 80 and 82 the abutment surface 90 of the arm 82 actuates a switch 122 mounted on the housing surface 78. When the arms 80 and 82 are fully opened, the switch 122 will be released and the abutment surface 86 of the arm 80 will actuate a switch 124, also mounted on the housing surface 78. The switches 122 and 124 are interposed in a control circuit (not shown) for the tool handling mechanism and provide a means of determining whether the gripper mechanism 30 is in proper condition for a next desired step in a sequence of operations. For example, the shaft 28 is intended to be both rotated about its longitudinal axis and reciprocated along said axis for the purpose of transferring a tool from the spindle 24 to the ready station. Before moving the shaft 28 in such fashion, it should be known whether the arms 80 and 82 of each mechanism 30 are properly gripping a tool. If the arms 80 and 82 have not fully closed to grip a tool, the abutment surface 90 will not have actuated the switch 122 and this condition will be detected by the control circuit and a suitable signal can be given to the machine tool operator so that he can correct the problem.

As will be apparent from FIG. 4, when the arms 80 and 82 are fully closed, the locking pins 84 will be positioned in the openings 50 of the tool and the pin 96 will be positioned in the tool opening 48. Also, a flat abutment surface 128 on the end of the arm 80 between the pins 84 will conformably engage the flat surface 54 on the tool flange 42. Likewise, a flat annular abutment surface 130 on the flange 94 of the arm 82 will flatly engage the flat annular surface 52 on the tool flange periphery 46. In this condition a clearance desirability exists between the ends of the pins 96 and 84 and the bottoms of the openings 48 and 50, respectively. This simplifies the establishment of proper tolerances and eliminates the necessity of drilling the holes 50 to exactly the same depth and positioning the two pins 84 to project accurately by the same amount. It will be seen that the pins 84 and 96 have chamfered extremities which facilitate the entry of said pins into their respective tool openings in the event that a perfect alignment between the pins and openings does not exist.

FIG. 7 illustrates a modified form of the present invention utilizing the same housing 64 and piston 106, but employing a closure member 132 having no hydraulic fittings in place of the closure member 116. Accordingly, no hydraulic fluid is directed to the right-hand end of the cylinder bore 110. In lieu thereof, a spring 134 is positioned between the closure member 132 and the right-hand end of the piston 106. The spring 134 normally maintains the piston 106 at the left-hand end of the bore 110, as illustrated, to keep the arms 80 and 82 closed. The arms are opened by the introduction of hydraulic fluid under pressure to the left-hand end of the bore 110 through the fitting 118 in the closure member 114. The introduction of such hydraulic fluid biases the piston 106 against the spring 134 and moves it to the right-hand end of the bore 110. When the fluid pressure is relieved, the arms 80 and 82 will again close. The embodiment illustrated in FIG. 7 has the advantage that if hydraulic power is lost during the handling of a tool, the arms 80 and 82 will remain closed and not drop the tool.

It will be seen that the use of three pins 84 and 96 positively grip the tool and hold it in the desired attitude. The grip on the tool does not rely on friction and, therefore, the use of extremely strong springs or the like is not required. The tool will be securely retained by the arms 80 and 82 even though it may be subjected to substantial inertial forces during the movement of the shaft 28.

It will be apparent that the tool handling mechanism of the present invention may be either manually or mechanically loaded. While one gripper mechanism is poised around the tool 32 and/or the spindle 24, the other gripper mechanism 30 is in the ready station where it may be unloaded and then loaded with the tool 34 which will be used for the next machining operation. It will be seen that the ready station of the gripper mechanism 30 holding the tool 34 is highly accessible to the machine operator as it is lower than the spindle 24 and to the operator side of the column 20. Accordingly, it is more convenient to insert a tool (and, particularly, a heavy tool) in the gripper mechanism at the ready station than it is to insert a tool in the spindle socket 60.

Upon the completion of a given machining operation, the arms 80 and 82 of the gripper mechanism 30 adjacent the spindle 24 are caused to close on the flange 42 of the tool 32. For this purpose, the spindle 24 must be brought to rest in a given angular position, but this poses no particular problem. The closing of the gripper mechanism 30 at the spindle 24 may be accomplished as a result of a programmed cycle in a tape or numerically controlled machine or it may be accomplished by the machine operator manually pushing a button. In either case, the shaft 28 is then caused to advance along its axis to withdraw the tool 32 from the spindle 24. The shaft 27 is then rotated 180° to present the tool 34 to a position in axial alignment with the spindle socket 60. The shaft 28 is then retracted along its axis to insert the new tool 34 into the spindle socket 60 and to position the old tool 32 in the ready station. The arms 80 and 82 of the gripper mechanism 30 at the spindle 24 are then opened and the next machining operation is commenced. The pins 84 and 96 open to a diameter greater than the diameter of the spindle 24 permitting the spindle to be fed between said pins without interference. The pins 84 and 96 of the one gripper mechanism 30 remain poised around the tool flange 46 and/or the spindle 24 during the machining operation.

The entire device has the advantage that the unloading of an old tool from the ready station and the loading of a new tool into the ready station is accomplished while the machine 10 is actually machining a workpiece. The physical interchange of tools in the spindle which must be done when the machine 10 is idle is accomplished very rapidly by mechanical means. This rapid interchange minimizes the idle time that the machine is not actually machining a workpiece. Accordingly, the use of the tool changing mechanism of the present invention will increase the efficiency of a machine tool with which it is used and minimize the idle time required for changing tools. Also, and as indicated above, the location of the ready station occupied by the gripper mechanism 30 in the ready station minimizes the physical work required of the machine operator in physically handling the tools. It should be pointed out, however, that the gripper mechanism 30 in the ready station may be mechanically loaded, if desired. Also, the gripper mechanism 30, and the tool handling mechanism associated therewith, may be used for transferring tools into and out of tool storage facilities or locations other than drive spindles.

While it will be apparent that the preferred embodiments of the invention illustrated herein are well calculated to fulfill the objects above stated, it will be appreciated that the invention will be susceptible of modification, variation and change without departing from the fair meaning or scope of the subjoined claims. In such claims the expression "tool" is meant to include what is conventionally thought of as a "tool holder." In other words, the word "tool" is intended to include any body which is adapted to be driven by a machine drive spindle, whether such body directly or indirectly carries a metal cutting element.

What is claimed is:

1. A tool having a shank adapted to be received in the drive spindle of a machine tool and a radially extending peripheral flange provided with first recess means operable to receive the drive key of a drive spindle and second recess means including radially inwardly extending opening means disposed on opposite sides of said flange between said first recess means and arranged to receive the fingers of a tool gripping mechanism.

2. The structure set forth in claim 1 in which one opening means is of a shape operable to prevent angular movement of the tool about an axis extending between said openings when engaged by a complementary shaped finger of a tool gripping mechanism.

3. The structure set forth in claim 1 in which said second recess means comprises a single bore on one side of said flange and a pair of circumferentially spaced bores on the opposite side of said flange.

4. The structure set forth in claim 3 in which said pair of bores are disposed parallel to and on opposite sides of the bore on the other side of the tool.

5. A tool according to claim 1 in which said opening means are open only to the outer periphery of said flange.

6. The structure as set forth in claim 5, including flat surfaces on the outer periphery of said flange adjacent said opening means and engageable with a tool gripping mechanism having fingers receivable in said opening means.

7. A tool handling mechanism adapted to grip and transfer a tool including a pair of elongated spaced arms, one of said arms having a portion extending therefrom into a position in diametrically opposed alignment with the other of said arms, projections formed on the ends of each of said arms extending generally toward one another and adapted to be received in openings of a tool to be gripped, and means for relatively moving said projections toward and away from one another.

8. A tool handling mechanism according to claim 7 in which said arms are provided with abutment surfaces adjacent said projections engageable with surfaces of a tool to be gripped.

9. The structure set forth in claim 7 in which said means for moving said projections includes rack teeth formed on said arms and a pinion engageable with said rack teeth.

10. The structure set forth in claim 9, including a piston having a rack associated therewith engageable with said pinion for producing rotation of said pinion and consequent reciprocation of said arms.

11. A tool handling mechanism according to claim 10 including a housing having a bore in which said piston is reciprocable and means for directing fluid under pressure to the opposite ends of said bore to operate said piston.

12. A tool handling mechanism according to claim 10 including a spring at one end of said piston operable to bias said piston in one direction, and means for directing fluid under pressure to the other end of said piston for producing movement of said piston in a direction against said spring, said piston being operable to move said projections toward one another when it is moved by said spring.

13. The structure set forth in claim 7 in which said means moves one of said arms and a switch actuated by said one arm.

14. A tool handling mechanism according to claim 7, in which one of said arms has a single projection and the other of said arms has a pair of parallel projections disposed on opposite sides of the axis of the projection on said one arm.

15. In a machine tool having a rotary drive spindle, that improvement consisting of a tool loading and unloading device including a pair of diametrically opposed tool grippers, each of said tool grippers having a pair of tool engaging portions movable toward and away from one another, means operable to interchange said grippers between a tool loading and unloading position and a position adjacent said drive spindle, the tool engaging portions of said grippers when in said position adjacent said drive spindle being located on opposite sides of the spindle axis and being movable perpendicular to the spindle axis to provide a space therebetween greater than the diameter of said spindle whereby said spindle may be advanced between said tool engaging portions during a machining operation.

No references cited.

RICHARD H. EANES, JR., *Primary Examiner.*